J. KOLETAR & J. FEKETE.
VALVE GRINDING TOOL.
APPLICATION FILED JAN. 23, 1914.
1,092,652.
Patented Apr. 7, 1914.
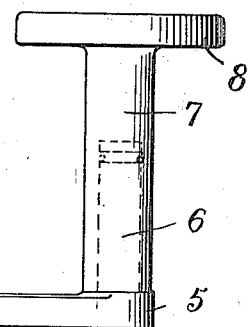
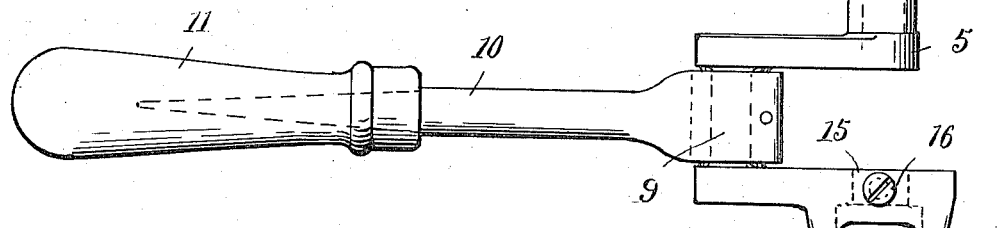
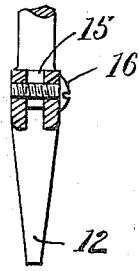
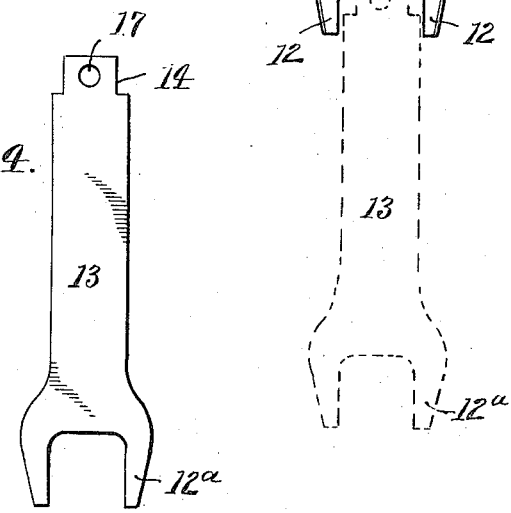
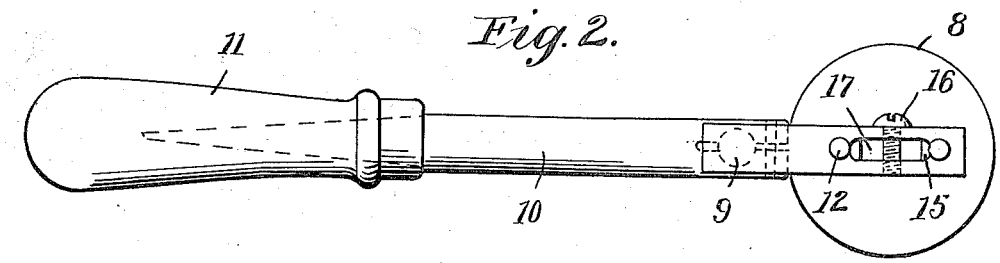
Witnesses
Natalie Newman
Ivan L. Morehouse
Inventors
Joseph Koletar and
John Fekete
By Chamberlain + Newman
Attorneys

UNITED STATES PATENT OFFICE.

JOSEPH KOLETAR AND JOHN FEKETE, OF BRIDGEPORT, CONNECTICUT.

VALVE-GRINDING TOOL.

1,092,652.

Specification of Letters Patent.

Patented Apr. 7, 1914.

Application filed January 23, 1914. Serial No. 813,837.

*To all whom it may concern:*

Be it known that we, JOSEPH KOLETAR and JOHN FEKETE, citizens of the United States, and residents of Bridgeport, in the county of Fairfield and State of Connecticut, have invented certain new and useful Improvements in Valve-Grinding Tools, of which the following is a specification.

Our invention relates to valve grinding tools such as are employed for grinding and regrinding valve seats of gasolene motors, and it especially refers to what are known as hand grinding tools.

The object of the invention is to produce a simple and inexpensive form of valve grinder that can be used to advantage in connection with the grinding of valve seats of various styles of gasolene motors; to provide a tool which is especially convenient and adapted for grinding seats of certain forms of motors where but a limited amount of space is available for the use of the tool; further to provide a tool which can be made to produce either an oscillatory or rotary movement and whereby the valve may be properly ground to its seat; finally to provide a valve grinder in connection with which extension tools may be used so as to further and better adapt it to various forms of motors and conditions which are found to exist in the numerous automobile constructions.

With these general objects in view and others as will appear the invention consists in certain novel and peculiar features of construction as will hereinafter be more fully described and claimed and in order that it may be more fully understood reference is hereby had to the accompanying sheet of drawings forming a part of this specification and upon which—

Figure 1 shows a side elevation of our improved valve grinder complete an extension blade being indicated in dotted lines in connection therewith. Fig. 2 is a bottom plan view of the invention as shown in Fig. 1. Fig. 3 is a slightly enlarged detail vertical sectional view taken on line 3—3 of Fig. 1, and Fig. 4 is a detached side elevation of the extension blade adapted to be used in connection with the tools shown in Fig. 1.

Referring in detail to the characters of reference marked upon the drawings 5 represents the main body of the valve grinder and which as shown is in the form of a crank and includes an upwardly extended round pivotal stem 6 over which the hollow shank 7 of the handle 8 extends. A round cross bar 9 forms a part of the crank and joins the outer end portions of the two horizontally disposed members together and serves as a means for the pivotal attachment of the shank 10 of the operating handle 11. This bearing is thus obviously arranged off from the axis of rotation of the tool and forms a leverage for the operation of the same. The lower portion or head of the tool is provided with a pair of downwardly extended fingers 12—12 and whose ends are properly spaced one from the other to engage holes formed in the top of the valve to be ground, and not shown, thus providing for the direct attachment of the grinder to the valve in such cases as where the tool can be brought into close relation with the valve. These fingers are obviously arranged at an equal distance from the center or axis of rotation of the grinder so that the axis of rotation of the valve will be directly beneath that of the grinding tool.

We also provide in connection with our valve grinder an extension blade 13 as shown in Figs. 1 and 4 which is designed to be attached to the grinder proper and is to be used in connection with the same for the grinding of valves in such places and where the tool proper cannot be brought into close relation with the valve as above suggested. This extension blade is shown in both Figs. 1 and 4 and includes extended fingers 12ª for engagement with the holes in the valve and also a reduced shank end 14 that fits into an elongated slot or pocket 15 formed in the lower portion of the lower bridge of the grinder and directly in line with the opening or space formed between the before mentioned fingers 12. A screw 16 is seated in the body of the grinder and in line with the said pocket so as to engage the hole 17 in the shank of the extension blade when the latter is shoved into position. This obviously serves to securely hold the blade in position when desired.

It is especially desirable in connection with a tool of this sort to employ an operating handle of the general type shown and which may be disposed outward to one side so as to reduce the amount of space necessary to swing the crank of the grinder. It will also be noted that the size of the grinder and crank as thus constructed is comparatively small, thus again making it necessary to employ a handle of this kind and in order to produce a valve grinder as before stated which may be arranged and operated in a comparatively small space.

In operating our improved grinder the handle 8 of the same is supported by one hand of the operator directly in line and above the valve to be ground, while the lower portions or fingers 12 are set into engagement therewith. The other hand of the operator engages the handle 11 so that the same may be worked either directly forward or backward or given a forward and backward swinging movement in a way to throw the crank completely around and impart to the grinder continuous rotary movements.

Having thus described our invention what we claim and desire to secure by Letters Patent is:

1. A valve grinder comprising a body in the form of a crank and having an upwardly disposed pivotal stem, a head directly beneath the said stem and having two integral and downwardly extended fingers for engagement with a valve, a pivotal bar forming the bearing of the crank, an outwardly disposed handle pivotally connected to the said bar, and a handle rotatably connected to the upwardly extended pivotal member of the body of the grinder.

2. A valve grinder comprising a body forming a crank and including a head having downwardly extended finger ends and having a pocket arranged in said head above and between the said fingers to accommodate an extension blade, a handle connected to the upper portion of the body and in line with the said pocket of the head, and an outwardly extended operating handle pivotally connected to the bottom of the said crank.

Signed at Bridgeport in the county of Fairfield and State of Connecticut this 17th day of January A. D., 1914.

JOSEPH KOLETAR.
JOHN FEKETE.

Witnesses:
C. M. NEWMAN,
RUTH M. WORDEN.